No. 792,553. PATENTED JUNE 13, 1905.
C. F. PORTER.
SKIRT AND WAIST HOLDER.
APPLICATION FILED AUG. 13, 1904.
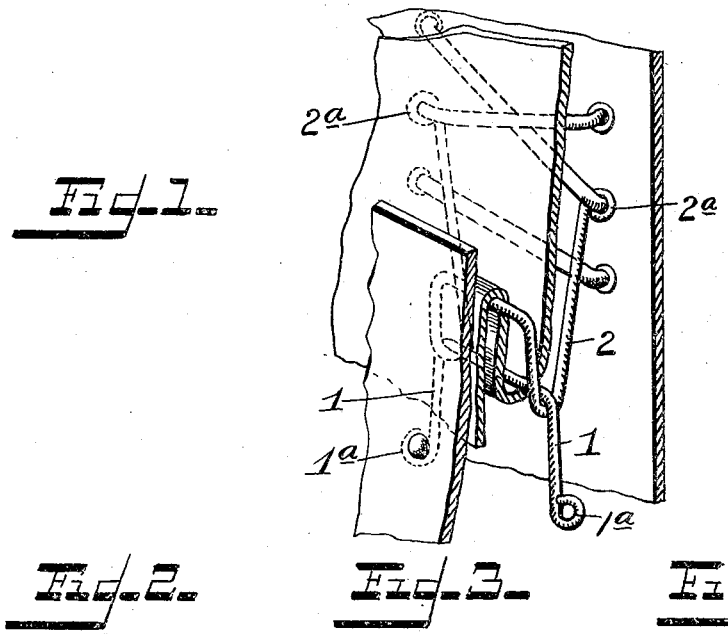
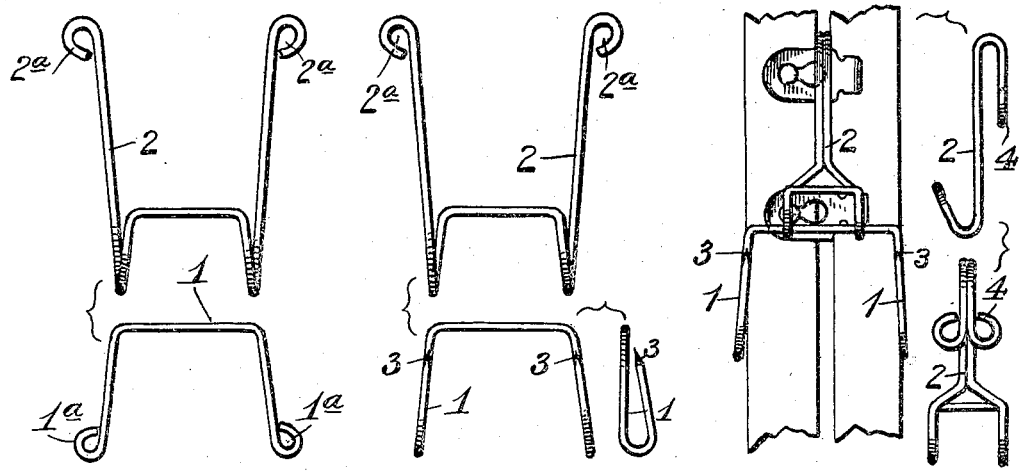
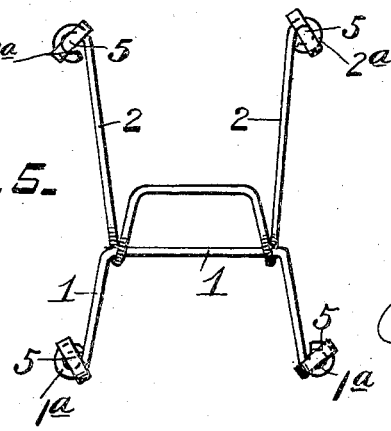
Inventor:
Charles F. Porter.

No. 792,553. Patented June 13, 1905.

UNITED STATES PATENT OFFICE.

CHARLES FRANCIS PORTER, OF BOSTON, MASSACHUSETTS.

SKIRT AND WAIST HOLDER.

SPECIFICATION forming part of Letters Patent No. 792,553, dated June 13, 1905.

Application filed August 13, 1904. Serial No. 220,675.

*To all whom it may concern:*

Be it known that I, CHARLES FRANCIS PORTER, a citizen of the United States, residing at Boston, in the county of Suffolk and State of Massachusetts, have invented new and useful Improvements in Skirt and Waist Holders, of which the following is a specification.

My invention relates to improvements in that class of devices which may be termed "waist and skirt holders" adapted for women's as well as children's dresses.

It has for its object to provide for the ready, effective, and convenient holding of the respective parts of the dress above noted and to promote simplicity and cheapness in manufacture; and to these ends said invention consists of the structural details substantially as hereinafter more fully disclosed, and particularly pointed out by the claim.

In the accompanying drawings, illustrating the preferred embodiment of my invention, Figure 1 is a view of the same as applied for use. Fig. 2 shows disassembled views of the members of said invention. Fig. 3 is a modification thereof with the skirt-holding member provided with pointed or sharpened terminals. Fig. 4 is a second modification of the same with the waist-holding member as adapted for being held in place by insertion under the meeting corset steels or stays. Fig. 5 is a view showing said member as held in place by the use of rivets or what may be ordinary paper-fastenings.

In the carrying out of my invention I construct the same of two members 1 and 2, the upper or waist-holder member 2 being upturned at its lower end and preferably rectangular in general outline, thus forming an approximately bail-like hook. Said lower or skirt-holder member 1 is also bail-like in construction, but not hook-shaped, and is adapted to receive the upturned lower end terminal of the waist-holder member or hook 2, as shown. Both the bail or lower member 1 and the upper member or hook 2 have their lower and upper extremities formed into eyes or loops $1^a$ and $2^a$, respectively.

In applying the device the upper member or hook 2 may be connected to the corset by suitably passing the corset-lacing through the upper eye-ended terminals $2^a$ of said member in the operation of lacing or securing the corset upon the body of the wearer, as shown in Fig. 1, and whereby said hook may be adjusted higher or lower, as circumstances may require, in accordingly adjusting the skirt by disposing said eye-ended terminal into correspondence with the required eyelet-holes of the corset and passing the lacing through said eye-ended terminals and eyelet-holes and securing the same in position, as pointed out. The lower member or bail 1 is secured to the skirt by inserting through the eye-ended terminals $1^a$ thereof suitable fastenings, as rivets, or they may be in the form of the ordinary paper-fastenings and suitably passing the same through the skirt at the back. The waist, as a shirt-waist, is pulled down over the upper hook member 2 and the lower member or bail 1 applied to the shirt-waist, suitably moving or forcing the waist down upon the hook member, thus infolding said waist upon the latter with the requisite stress to effectually connect the waist and skirt together and hold the same properly in place upon the body of the wearer and yet not exert undue strain thereon, but only to that extent which would not tend to tear or impair the lightest or thinnest dress material. In the modification as exemplied by Fig. 3 the lower eye-ended terminals above described are omitted and said terminals tapered to sharp points, as at 3, to penetrate said material.

In the modification as disclosed by Fig. 4 the upper hook member has its upper end reversely bent or formed with a hook 4 extending downward oppositely to the lower end hooked portion of said hook member, as previously described. By this construction the eye-ended terminals, as above noted, remaining intact are adapted to be inserted edgewise in between and behind the fastening corset-steels and then be turned to present their eye portions flat against the latter and thus held or secured in position unaided by other fastenings. In Fig. 5 the same form of upper hook member is shown as having rivets 5 or what may be ordinary paper-fastenings passing through its eye-ended terminals, as in securing the same to a shirt-waist.

Latitude is allowed as to details herein, as they may be changed as circumstances suggest without departing from the spirit of my invention.

I claim—

A device of the character described, comprising an upper bail-like member having upper and lower end reversely-bent or hook-shaped terminals, the upper end hook-shaped terminal also having lateral extensions arranged in the plane of said upper end terminal and beyond the plane of said bail-like member itself, and a lower eye member also of bail-like outline and effective for connection to the aforesaid bail-like member.

In testimony whereof I have signed my name to this specification in the presence of two subscribing witnesses.

CHARLES FRANCIS PORTER.

Witnesses:
H. S. WOOD,
A. J. McETTRICK.